(No Model.)
L. W. STOCKWELL.
ELECTRIC MOTOR
No. 298,130. Patented May 6, 1884.
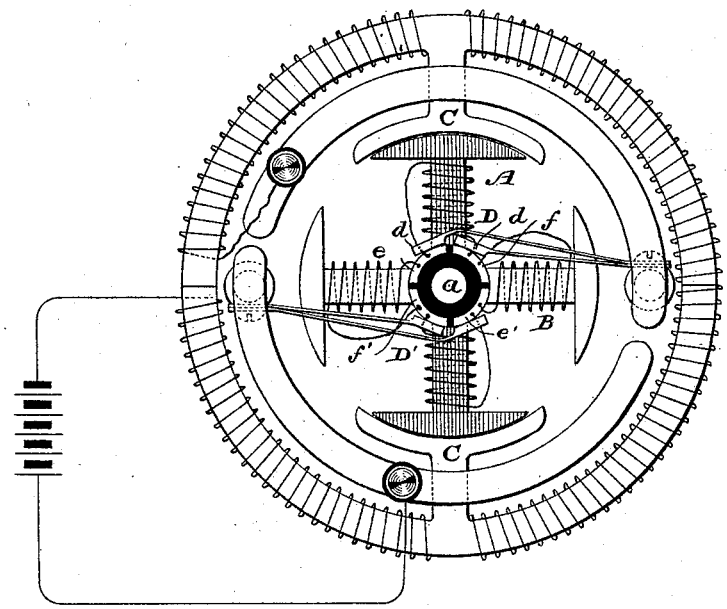
WITNESSES
INVENTOR
Levi W. Stockwell
By his Attorneys

UNITED STATES PATENT OFFICE.

LEVI W. STOCKWELL, OF CLEVELAND, OHIO, ASSIGNOR TO THE CLEVELAND ELECTRIC MOTOR COMPANY, OF SAME PLACE.

ELECTRIC MOTOR.

SPECIFICATION forming part of Letters Patent No. 298,130, dated May 6, 1884.

Application filed December 18, 1883. (No model.)

*To all whom it may concern:*

Be it known that I, LEVI W. STOCKWELL, of Cleveland, county of Cuyahoga, and State of Ohio, have invented certain new and useful Improvements in Electric Motors, of which the following is a specification.

My invention relates more especially to that class of motors shown in my Letters Patent No. 291,636, granted to me January 8, 1884, and constitutes an improvement upon the machine therein shown.

It is deemed unnecessary to describe in detail the machine herein illustrated, so far as its construction corresponds with that of the machine illustrated in my Letters Patent just mentioned, and reference is hereby made to that patent for a complete description of said details of construction.

My present invention consists in an improved manner of winding the armature-cores, and also in certain improvements in the arrangements of the brushes.

The accompanying drawing is a diagrammatic view illustrating the general character of the machine, and showing the winding of the armatures, the commutator-connections, and the brushes.

The armatures A and B are mounted upon a spindle, $a$, and rotated between the poles C of a field-magnet, the field on each side of the armature-spindle being of uniform polarity.

The brushes D D' are constructed so as to give two points of contact on each side of the armature-ring for the same purpose described in my patent—that is, so that the current will be cut off from the coil of each magnet during a portion of a revolution. In the present case this is effected in substantially the manner disclosed in my patent above mentioned—that is, a pair of brushes is placed on each side of the ring, and the brushes are so bent, or their ends so disposed, that two points of contact on each side of the ring are made, which construction results in cutting out each armature-coil during a portion of a revolution, as will presently be described.

The brushes D D' illustrated differ from those shown in my prior application, in that the ends are formed of blocks or enlargements $d$ thereon, which enlarged portions bear upon the ring. The arms of the brushes are elastic, and are mounted on suitable posts in the way shown in my prior application. The brushes of each pair are preferably arranged one above the other and do not cross. They may therefore be of any desired width. One pair of brushes, D, is connected with one pole of the battery, and the opposite pair of brushes, D', is connected with the opposite pole of the battery.

In my patent mentioned each armature-core is wound continuously, and the ends of the wire are connected with opposite commutator-plates on the ring. Under that organization, when the brushes on each side of the ring made contact with one pair of commutator-plates—that is, the two opposite plates—the armature-coil connected with the other plates was completely cut out of circuit, and when the brushes rested upon all four plates, then both armature-coils were included in the circuit. The object in thus working is that the coil of one magnet when at the dead-point will be cut out, so as to offer a minimum resistance to the rotation of the spindle, while the entire current will pass through the coil of the other magnet, which is in favorable position to be acted on. This is fully described in my said patent. In the present case each half of each magnet—that is, the portion on one side of the armature-spindle—is wound with an independent wire, and the two ends are connected with two adjoining commutator-plates. Thus, as clearly illustrated in the drawing, the upper half of the magnet A is wound with a wire, one terminal of which is connected with the commutator-plate $f$, while the other terminal is connected with the adjoining commutator-plate $e$. The coil on the opposite half of the magnet A has one terminal connected with the commutator-plate $e'$, and the other with the plate $f'$. The coil on the right-hand side of the magnet B has one terminal connected with the commutator-plate $f$, and the other with the commutator-plate $e'$, and the coil on the opposite side of this magnet is similarly connected. Under this system of winding, it will be perceived that when the brushes bear on all the commutator-plates, as indicated in the drawing, the current will pass from one of the brushes D, through the commutator-plate $e$, through the left-hand coil of the magnet B, and plate $f'$, to the opposite commutator-brush D'. The coil on the opposite half of the magnet B will take its current from one of the brushes D, through the plate $f$ to the plate $e'$, and then through the opposite brush D'; and it will be perceived that both sections of the magnet A will be short-circuited, because upon following the circuit, as shown in the drawing, it will be clear that a current passing from the brush D through the contact $f$ into the coil on the upper half of the magnet A would come to the commutator-plate $e$, on which the other brush D rests; and as both brushes D are connected with the same pole of the battery, no current will pass through that coil. The same is true of the opposite coil on the other half of the magnet A. Therefore, when the brushes rest on all four of the contacts, one of the magnets is cut out of the circuit, and when the spindle is rotated so that the brushes rest on two opposite contacts only, the current will of course divide and pass through all of the coils. This manner of winding the armatures is thought to be specially useful in large machines where a high electro-motive force is employed. Smaller wires may also be used for the winding of the armature, for the reason that when the current is passing through the coils of one magnet only it divides, half passing through each section of the magnet. The enlarged or thickened end of the brush affords greater wearing-surface and imparts a greater stability to the end of the brush, so that a good contact with the ring is made. Obviously, three armature-sections may be employed, in which case there will of course be three pairs of commutator contact-strips, and the armature-sections will be successively cut out of circuit a portion of each revolution.

I claim as my invention—

1. The combination, substantially as set forth, of the armature-spindle, the armature-magnets arranged thereon transversely to each other, an independent coil on each half of each armature, the terminals of which coil are connected with adjoining commutator-plates, as shown, the commutator-ring, and brushes arranged to give an extended or double contact on each side of the ring, for the purpose set forth.

2. The combination, substantially as set forth, of the field-magnet poles having a uniform polarity on each side of the armature-spindle, the armature-spindle, the armature-magnets arranged thereon transversely to each other and in different vertical planes, the commutator-plates, the brushes arranged to give an extended or double contact on each side of the ring, and an independent coil on each half of the armature, the terminals of which coil are connected to adjoining commutator-plates, as set forth.

3. The combination, substantially as set forth, of the field-magnet poles, the armature, the commutator-ring, and the commutator-brushes arranged in pairs—one pair on each side of the ring—the brushes in each pair being arranged one above the other, as described.

In testimony whereof I have hereunto subscribed my name this 15th day of December, A. D. 1883.

LEVI W. STOCKWELL.

Witnesses:
 THEODORE SIMMONS,
 A. H. ATWATER.